Aug. 3, 1965    P. PRESUNKA    3,198,544
PROTECTION BARRIER FOR VEHICLE PASSENGERS
Filed June 4, 1962    2 Sheets-Sheet 1

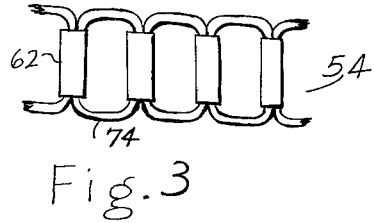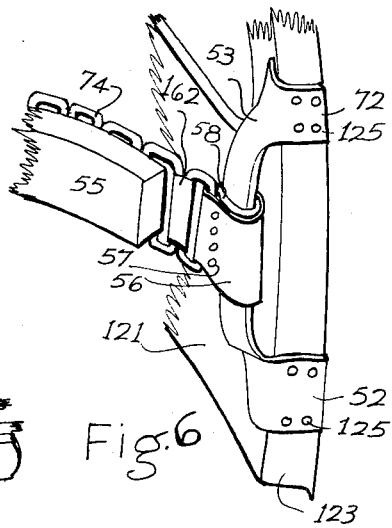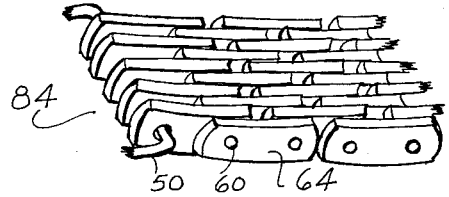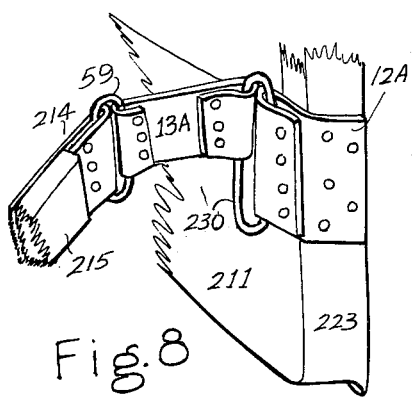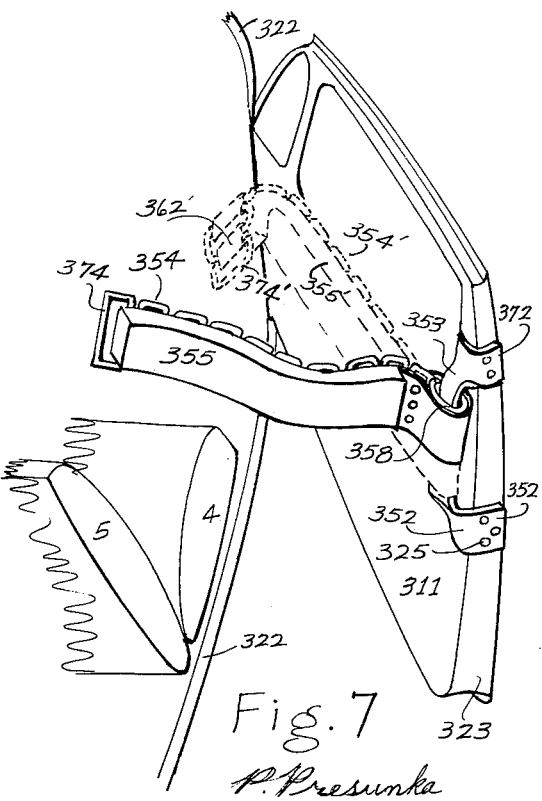

United States Patent Office 3,198,544
Patented Aug. 3, 1965

3,198,544
PROTECTION BARRIER FOR VEHICLE
PASSENGERS
Peter Presunka, Ottawa, Ontario, Canada, assignor of fifteen percent each to Mary Presunka for Wesley Presunka, Fort William, Ontario, and Steve Presunka, Ottawa, Ontario, Canada
Filed June 4, 1962, Ser. No. 199,687
10 Claims. (Cl. 280—150)

This invention relates to vehicle passengers' protection device which combines features of both a rigid crash bar and a safety belt.

This device is essentially a group restraining barrier which is placed across the entire width of the vehicle seat and which is designed to be placed in near contact with the passengers' bodies generally in the lap or the chest region; and it is also designed to flex and accommodate itself to the passengers' bodies in the horizontal plane either in response to manipulation or when the passenger is thrown against it under impact conditions. This flexing enables this barrier to distribute the impact load over the largest possible area of the passengers' bodies. In this respect this device is similar to the safety belt.

This device differs from the safety belt in that it is constructed of substantially rigid materials, and which will flex into any curve in the horizontal plane only under positive manipulation or impact loading, but which will retain sufficient vertical rigidity under all other conditions to support itself wherever it is placed thus offering great advantages over the safety belt in such aspects as the mounting of this safety device in the vehicle, in the convenient storage of the device, in bringing the device into position of use, and in the maintenance of neatness and general accessibility of the vehicle to the passengers using it. This device has the further advantage over the safety belt in that the rigid materials such as metals employed in its construction and mounting to the vehicle give it much geater holding strength and therefore greater eventual safety feature. It has also offers the advantages of a thickness layer of padding which will cushion the shock of impact.

This device differs from the crash bars of prior art in that it is designed to flex and accommodate itself to the bodies of the passengers using it but which maintains its rigidity during normal handling conditions. It is also constructed in such a manner as to be manipulated much more readily than any crash bar of prior art. Its detachably connecting means and its rigid, vertical, hinged construction and self supporting feature set it apart from any known crash bars, safety trays, or safety belts. It has the further advantageous feature of compactness and conveniently located storage position when not in use.

These and other advantages will become more obvious when the following disclosure is considered in connection with the following drawings:

FIG. 1 is a three dimensional view of the front seat region of a passenger vehicle with the roof cut-away, in which is shown the protection device in two positions:
 (i) in dashed lines, this device is stored against the doors, and designated by undashed numerals.
 (ii) in solid lines, this device is partially extended across the front seat in its self supporting attitude, prior to being connected together for use by the seat occupants and designated by undashed numerals.

FIG. 3 shows a side view of a vertically rigid and horizontally flexible chain link construction of such a barrier as is illllustrated in FIG. 6 and FIG. 7.

FIG. 4 is an edge view of the chain link structure shown in FIG. 3.

FIG. 5 shows another type of sectionally foldable, vertically rigid and horizontally flexible structure such as may be utilized in the barriers of FIGS. 6 and 7.

FIG. 6 shows an attachment means of the chain-link barrier to the trailing edge of a vehicle door such as would permit barrier height adjustment.

FIG. 7 illustrates one version of a right hand portion of a detachable connectable barrier in the vehicle in two positions, in storage position against the vehicle door as designated by dashed numerals, and in a partly extended position of use prior to being connected with a mating left hand portion and designated by undashed numerals.

FIG. 8 shows the details of a still another attachment means of the barrier to the trailing edge of a vehicle door, which incorporates one deep hinged link for height adjustment.

Figure 1:
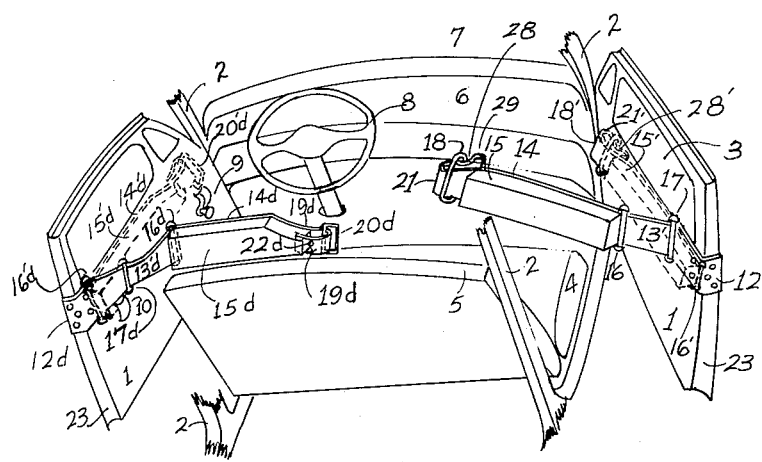

The protection device shown in the vehicle in FIG. 1 consists of two sections, the left hand section on the vehicle driver's side and designated by the letter $d$ beside every numeral, and the right hand section, and designated by corresponding numerals without the small case letter $d$. These two sections fold or hinge into their storage positions against their respective doors as shown in dashed lines and designated by undashed numerals.

This protection device is essentially a restraining barrier, consisting of a metal strap 14 which is hinged at at least one point 16, and in the present device it has two such hinges 16 and 17, and an attachment bracket 12 which is attached most securely to the trailing edge 23 of the vehicle door 1, by steel studs 25 and also by a few additional studs 25 next to the hinge 17 to the inner face of the door to add to the rigidity of the fixed hinge 17. These additional studs next to the fixed hinge 17 are designed to fail under impact loading and will thus provide a part of the predetermined yielding. The studs which secure the strap 12 to the trailing edge of the door are designed to withstand the maximum designed stress. The hinges 16 and 17 are similarly designed to withstand maximum stress under all impact conditions. The shorter length 13 of the strap which is located between the fixed hinge 17 and hinge 16 is not covered with a pad 15, since it is designed to fold together in a compact sandwich against the door and thus acts as the needed foldable extra length. The inside face of the vehicle door in front of the passenger is not great enough in horizontal extent to accommodate in storage the needed barrier length; but it is only by the above hingedly foldable structure that such accommodation can be made possible. The combined length of the two hinged sections of the strap 13 and 14 are long enough to form a continuous barrier with a mating combination from the opposite door or wall of the vehicle.

The simple hinge 17 of FIG. 1 is replaced by the long, vertically disposed closed parallel-limbed loop 30 also shown in FIG. 8, which loop connects the attachment strap 12 to the shorter length of strap 13. This loop permits the hinged barrier straps 13 and 14 to be moved vertically for the preferred height adjustment. This barrier would be placed in its lowest position as shown in FIG. 1 prior to or after pivoting the barrier into storage position, so as to locate it below the window line.

The end of the strap 14 is bent into a springy hook 21 as shown more clearly in FIG. 1. A retaining ring 18 slides between the strap padding 15 and the rounded end of hook 21 and may be urged to snap into a formed depression 28 in the hook 21 after the hook engages the proper connecting loop 20d and this ring 18 will remain in this formed depression 28 unless it is pushed off in combination with a positive thumb pressure compressing the bent over free end 29 of the hook 21. The end bulge of the hook 21 is made to be of such width that the retaining ring 18 cannot pass over it. The closed loop 20d which is securely connected to the free end of the strap on the vehicle driver's side is engaged by the hook 21, and the retaining ring 18 insures that this connection holds under all conditions until this ring 18 is dislodged from its depression 28 by a combined loop-compressive force manually exerted on the strap end 29 and a pull on the ring 18, pulling it out of the depression 28 over the strap end 29. The construction of this connection is made both rugged and obvious in operation so that anyone who looks at it will immediately understand its mode of operation. This is a very essential feature in any safety attachment, and makes it readily detachable by anyone under extreme crash conditions.

The rigid metal barrier strap 14 is covered with a pad 15 which is made sufficiently wider than the metal strap to insure that the passengers' bodies will not be brought in contact with the strap. The bonding of this pad 15 to the strap may be achieved by a combination of means such as by cementing it to the strap as well as by a pad-covering material which would cover both the pad and the strap. The pad 15 may be made of a non-resilient material which will crush under a predetermined range of impact forces and so provide a cushioning and energy absorbing action of this pad to the passenger. A two to three inch thickness of such material as rigid polyurethane foam may serve this purpose. Such rigid foamed materials may be formed to crush under any a designed predetermined range of impact loading. Resilient materials which can offer resistance to a wide range of forces always possess a very rapid kick-back or recovery force which returns stored energy to the passengers' bodies without a sufficient delay period, and result in little or no real advantage, except to assist in distributing the impact load over a larger portion of the passenger's body. A non-resilient but predeterminedly deformable material will achieve both of the above desired purposes. This pad 15 may be made longer than shown in the drawings, so as to cover the connecting linkages 18, 21.

Figure 2:
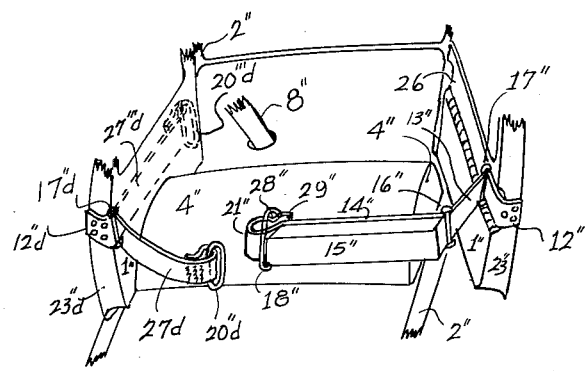
FIG. 2 shows the details of the same type of a stiff hinged and paddled barrier on the right hand side of the seat structure to be stored in a recessed storage in the door, and the free end of this barrier is connected to the opposite door of the vehicle by means of a flexible safety belt and a closed ring for the convenience of the vehicle driver.

The left hand section of this barrier which is used by the vehicle driver, and shown in the left hand portion of FIG. 1 shows cut-away ends, at 13′d and at 19′d. This is done to provide more elbow room for the driver. The wider, central portion, 14′d, gives the greatest possible protection to the driver without impeding his movements. An alternative arrangement may be used, as shown in FIG. 2 in which a flexible safety belt webbing 27d is shown on the left hand section of the drawing, with a closed loop 20″d attached at the end of this belt. This safety belt webbing is attached at the position of hinge 17″d of the attachment bracket 12″d which is bolted to the trailing edge 23″d of the left vehicle door 1″. This safety belt webbing 27d could be hung on the inside of the door by hooking the closed loop 20″'d over a lug provided for that purpose but not shown in the drawing. This may be a more practical method of completing the restraining barrier on the driver's side of the seat in the less roomy compact versions of American vehicles and in the smaller imported types.

The rear seat version of the above described restraining barrier, is simpler and consists of two very nearly similar sections, without any of the cut-away portions shown in FIG. 1. The right hand section is shown in FIG. 2, while the left hand section would be a mirror image of it in all respects except that its free end facing the connecting hook 21 would have a closed loop (as at 20d) riveted to it (as at 22d). This rear seat restraining barrier would thus offer the advantages over a safety belt because of general neatness in the car interior, of great strength, and of insuring that the vehicle doors will not be sprung open during any impact conditions, and the advantage of the thick padding carried by this barrier. The combination of the connecting hook 21 and closed loop 20 and the retaining ring 18 will insure that this barrier will remain connected under all conditions, and it also provides a readily detachable connection, since its simple structure makes it obvious at sight.

The compactness of this device in its folded condition may be further enhanced by providing a recessed space 26 in the interior face of the vehicle door as shown in FIG. 2 with corresponding parts designated by double-dashed numerals. Such recessed spaces 26 would also make it possible to use a thicker pad and thus offer a greater degree of protection. Such recessing of the said storage space could be done in conjunction with a better placement of door handles and window winders. In most vehicle models there is already ample space for storing the restraining barrier as described, in its storage condition. Limited recessing or cutting-away of portion of this barrer may also be done to clear the door handles and window winders.

In so far as no actual redesigning of the vehicle body structure is necessary to use this invention in most cars of today, this device may be provided as an important accessory item to vehicle owners in general. This device therefore features the ruggedness of a continuous metal-to-metal barrier, bolted or welded securely to the vehicle doors, and requiring no further attachments or modifications to the vehicle. It is a group safety device which is of an unusually simple design and is equally simple to apply. This device, being hingedly foldable, maintains its vertical rigidity, and is self supporting, and holds whatever position it is to be given, as when opening any door to permit a passenger to enter or leave the vehicle, and requires only a simple connection to be made to return it to its use condition. Placing it into storage is equally simple. After a simple detachment of hook 21 from ring 20d is made both sections of the barrier pivot readily into their storage position alongside of the vehicle doors.

This restraining passenger safety barrier may also employ predeterminedly yieldable metal linkages, which would permanently deform under the predetermined range of impact loading, and so absorb impact energy and in particular absorb the peak impacts which may be generated under impact conditions. Such linkages were claimed and described in my copending U.S. application Ser. No. 185,161, filed on April 4, 1962 under a title "Impact Energy Absorber." This yieldable material may be any tough and ductile metal (or even alloy) such as annealed copper, aluminium, which have a sufficiently low initial yield point and a sufficiently high fracture or ultimate strength point. This yieldable metal link may constitute the foldable length 13 between hinges 16 and 17, or it may include the whole of the strap 14, except the hook portion 21, which should be made of stronger and more "springy" metal such as steel, which may be riveted to the yieldable strap portion 14. The advantage of having strap 14 of such tough, ductile and yieldable metal is that it will adapt itself to the form of the passengers' bodies at lower values of impact force and will enable the passengers' bodies to occupy and hold the bulges formed in this restraining barrier and so distribute the impact over the widest possible area of the body, just as the safety belt does. The thick padding will provide the initial cushioning action at lower and medium impact intensities, and the yieldably extensible metal strap 14 will elongate and cushion the shock under the more severe impact forces.

It may also be advantageous to have the attachment 12, the short length 13, and the hinges 17 and 16 as well as hook 21 all made of steel in the interests of rigidity and strength, but only the central strap portion 14 formed of a ductile and extensible metal, which would provide the yield and the required flexibility under impact conditions. This central (copper) strap 14 would be probably riveted to steel portions which would be formed into the hook 21 and a hinge 16. The central strap portion 14 would be the only part that would vary in length for different vehicles and the whole assembly could also be made up into handy kit assemblies as an accessory safety item. The hinges would be of a closed or welded construction for obvious reasons of strength. Soft aluminium of sufficient thickness would probably be suitable for the extensible central strap portion 14 and would have the added advantage of lightness and improved appearance. It may also be practical to employ a thickened section of a tougher variety of a ductible metal for the attachment strap 12, the hinges 16 and 17 and the shorter strap length 13 so as to incorporate the yielding of these structures under the more intense impacts and so offer greater protection against injury under intense impact conditions.

FIG. 7 shows a right hand portion of a detachably connectable barrier which is of a multiple link construction shown and which is flexible only in the horizontal plane, since all the links are connected by vertical pivot sleeves 62. This link barrier 354 is covered with a pad 355 on the passengers' side and is shown in two positions, in its storage position in dashed lines against the vehicle doors and designated by dashed numerals, and in its partly extended position, in the chest region of the passengers prior to being connected and designated by dashed numerals. This barrier has sufficient vertical rigidity to support itself at a selectable height in any position, which is a very convenient feature facilitating its handling and storage as well. To place it into storage, it is only necessary to pull it straight along the inside of the door, which position it will retain due to friction of its pivots.

In FIG. 3 is shown a plan view of one type of chain link structure which may be employed in the barrier shown in FIG. 7. FIG. 4 shows the same chain link structure in vertical section.

FIG. 5 shows still another multiple hinged structure which could be employed as the strength member of the barrier shown in FIG. 7.

Other varieties of chain link and wire belting are available which would function equally well in this barrier.

FIG. 6 shows in greater detail the attachment means of the barrier of FIG. 7, which comprises a long vertical bracket 53 fastened to the trailing edge 23 of the vehicle door 1 at both top 72 and bottom 52 and permitting said barrier to be positioned at any point of that bracket for any convenient height adjustment. A bushing 58 is housed inside the attachment connecting yoke member 56 which attaches the multiple-link chain structure 54 to the vertical bracket 53. The impact absorbing pad 55 may extend beyond the point shown in FIG. 6 so as to cover the connecting yoke member 56 and bracket 53.

In FIG. 8 are shown connecting hinged pivot means comprised of straps 12A and 13 and of deep parallel limb closed rings 30 and 59 which replace the conventional hinge structure shown in FIGS. 1 and 2. The long vertical loop 30 permits height adjustment of the barrier, between the lap region at its lowest point, and the chest region at its highest point. The wedging action on a bushing 58 (which is not shown in FIGS. 1 and 2, but which may be usefully included) resulting from stiffness of the barrier will cause the barrier to hold whatever position is given to this bushing by a level lift or down push on this bushing.

The multiple link structures which satisfy the requirements of great tensile strength, lateral flexibility and a sufficient degree of vertical stiffness are available in wide range of widths, thicknesses, size of individual links, and in a variety of very strong or ductile metals. The link structure makes the length adjustment and anchorage problems very easy. The vertical stiffness of this barrier is not so great as to constitute a danger to the passengers where upward impact forces may be generated. The padding can be designed to cover the top and bottom edges as well as the side facing the passengers. These vertically stiff and laterally flexible barriers freeze in whatever position they are placed, and are nearly always at the passengers' finger tips in the normal course of their use, and in this way tend to remove the drudgery and constant attention necessitated from the use of complex safety devices of prior art.

There is also the very real need to keep the vehicle doors tightly shut in most crashes, not only to keep the passengers inside, but also to strengthen the vehicle body against collapsing on the passengers under impact. These barriers have a continuous metal to metal construction, and can be constructed strong enough to prevent the vehicle doors from flying open.

This vehicle barrier may be upholstered in the finishing fabric and colour to match the vehicle interior. By the additional measure of recessing the storage spaces as shown in FIG. 2, these stored sections of this device could be made to blend completely with the vehicle interior. This recessing however, could be done only by the vehicle body manufacturers, and would require their acceptance of the idea.

In conclusion one may add that the safety belt approach to the problem of safety has not gained wide public acceptance despite the most energetic efforts from many quarters. The inventor feels certain that this invention has a number of qualities about it which may gain wide acceptance for it, and thus serve the interests of passenger safety in vehicles under crash conditions.

I claim:

1. In a vehicle having a seat structure for passengers and a substantially vertical side wall and a door extending along each end of said seat structure, a safety device for said passengers comprised of
   (a) a horizontally extending barrier between said side walls generally in a lap region of said passengers, and
   (b) a pair of attachment means attaching the outer ends of said barrier to said side walls, and
   (c) a readily disconnectable connecting means connecting said barrier together substantially midway between said outer ends,
   (d) said barrier consisting of a substantially flat, tensile strength member with its greatest cross-sectional dimension placed in a vertical plane, and
   (e) a crushable padding structure secured to that flat side of said strength member which is nearest to said passengers, and
   (f) each of said attachment means consisting of at least one vertically disposed metal connecting hinged pivot means, and
   (g) a metal strap, one end of said strap being connected to said pivot means and an outer end of said strap being contoured and attached to said vehicle wall,
   (h) said barrier, said hinged pivot means and said strap possessing sufficient vertical rigidity to constitute a self-supporting, freely pivoting and selectably positionable barrier in a substantially horizontal plane in any position between and including the position of use in the lap region of said passengers and its storage position along said side walls.

2. In a passenger vehicle having a seat structure and a substantially vertical side wall formed by closed vehicle doors extending along both sides of seat structure, each of said doors being hingedly attached to said walls along its leading edge, a safety device substantially as described in claim 1 in which each of said pair of attachment means attaches each of the outer ends of said barrier to trailing edges of said doors, and in which each of said end straps is bent rearwardly from the point of its attachment to said hinged pivot means and extends horizontally along each of said doors to said trailing edge at which each said strap is bent outwardly and is adapted to be attached to said trailing edge.

3. In a passenger vehicle having seat structures and substantially vertical side walls extending along both sides of said seat structures, a safety device for vehicle passengers comprised of a horizontally extending barrier between said walls in a lap region of said passengers seated in said seat structures, a pair of attachment means attaching the outer ends of said barrier to said walls, and readily disconnectable connecting means connecting said barrier at a point substantially midway between said outer ends, said barrier consisting of a number of rigid elements connected in tandem by a number of vertically aligned hinged pivot means, said rigid elements selectably alignable and pivoting freely in a substantially horizontal plane about said hinged pivot means and a crushable padding structure secured to that side of the combination of said rigid elements and pivot means which is nearest to said passengers and in which each of said attachment means consists of a bar, aligned substantially vertically, and spaced apart from each of said walls over a portion of its length intermediate its ends, said ends being adapted to be attached securely to said walls and a connecting yoke member adapted to be secured to said barrier between its open limbs and engaging said bar at its closed end by virtue of being wrapped around it snugly.

4. In a passenger vehicle having seat structures and substantially vertical side walls extending along both sides of said seat structures, in which at least part of said walls are comprised of vehicle doors which are attached to said vehicle along their leading edges, a safety device for vehicle passengers substantially as described in claim 3 in which said ends of each of said bars consist of flattened extensions adapted to be secured to the trailing edges of each of said doors, said bar being spaced inwardly of and aligned with an inside line of the trailing edge of said doors.

5. In a vehicle having a seat structure and substantially vertical side walls extending along each side of said seat structure, a safety arrangement for vehicle passengers comprised of a combination of:
(a) a stiff, horizontally disposed barrier extending between side walls substantially at lap height of said passengers,
(b) a recess formed in at least one of said walls to be used as storage space for said barrier,
(c) said recess extending substantially along a horizontal line and terminating near the lap region of passengers at its rear end,
(d) a horizontally pivoting, vertically rigid attachment means, attaching one end of said stiff barrier to one of said walls at said end of said recess, and attaching another end of said barrier to another one of said walls,
(e) a disconnectable connecting means connecting said barrier at a point intermediate its ends,
(f) said barrier consisting of a strong and substantially flat metal strap pivoted about a vertical axis at its point of attachment to said attachment means and having its greatest cross-sectional dimension in a substantially vertical attitude, and
(g) a crushable padding cover secured to that flat side of said metal strap which is nearest said passengers.

6. In a vehicle having a seat structure for passengers and vertical side walls extending along both sides of said seat structure, a safety device for vehicle passengers comprised of:
(a) a vertically rigid flat barrier extending in a lap region of said passengers between said walls,
(b) said flat barrier having its greatest cross sectional dimension in a vertical attitude at all times,
(c) said barrier carrying crushable padding on that flat face of said barrier which is next to said passengers,
(d) a disconnectable connecting means connecting said barrier intermediate its anchorage points to said side walls, and
(e) a pair of attachment means each attaching one outer end of said barrier to points in said walls substantially at lap height, and extending rearwards along said side walls,
(f) each of said attachment means being comprised of:
(i) a first strong metal strap extending forwardly along said walls from its point of attachment to said wall and carrying a first vertical hinge at its forwardmost end, and
(ii) a second strong metal strap connected at one end to said first hinge and carrying a second vertical hinge at its other end, said second hinge connecting said second strap to said barrier,
(g) said second strap pivoting about said first vertical hinge into alignment with said barrier when in position of use in said lap region and into a folded position adjacent and parallel to said first strap when in storage.

7. In a vehicle having a front seat structure and substantially vertical side walls extending along both sides of said seat structure, part of said walls being comprised of vehicle doors pivotally secured along their leading edges, a safety device substantially as described in claim 1 in which each of said attachment means attaches ends of said barrier to a trailing edge of said door and in which said barrier and crushable padding have two cut-away portions on a vehicle operator's side, said cut-away portions being located in approximately elbow regions of said operator.

8. In a passenger vehicle having seat structures and substantially vertical side walls extending along both sides of said seat structures, a safety device for vehicle passengers substantially as described in claim 3 in which said bar has a greater vertical length than the vertical extent of said rigid elements intermediate its points of attachment to said wall, and in which said connecting yoke member carries a sliding sleeve member which is adapted to selectably slide on said bar or to hold its position at any chosen point on said bar.

9. In a passenger vehicle having seat structures and substantially vertical side walls extending along both sides of said seat structures, a safety device for vehicle passengers comprise of a strong metal strap, extending in a substantially horizontal line between said walls in a lap region of said passengers seated in said seat structures, said metal strap carrying crushable padding on the flat side facing said passengers, a pair of horizontally pivoting, vertically aligned hinge connecting means connecting each of the outer ends of said strap to said walls and a selectably disconnectable connecting means connecting two intermediate ends of said strap midway between its outer ends, said connecting means consisting of a hooked strap portion at one of said intermediate ends and a closed retainer ring adapted to be selectably slidable between two discrete positions on said hook, and a second closed ring attached to another of said intermediate ends and adapted to be slipped over said hooked strap portion into a holding engagement with said hook and retaining ring.

10. In a vehicle having seat structures and vertical walls extending along both sides of said seat structures, a safety device substantially as described in claim 1 in which one of said hinged pivot means has a greater vertical extent than the greatest cross-sectional dimension of said barrier, said barrier being adapted to be selectably vertically slidable on said hinged pivot means for height adjustment of said barrier.

References Cited by the Examiner

UNITED STATES PATENTS

| | | | |
|---|---|---|---|
| 1,830,059 | 11/31 | Hoffman. | |
| 1,973,011 | 9/34 | Morrison | 280—150 |
| 2,245,899 | 6/41 | Campbell | 280—150 |
| 2,677,573 | 5/54 | Anderson | 296—44 |
| 2,755,101 | 7/56 | Budde | 280—150 |
| 2,854,248 | 9/58 | Stocker | 280—150 |
| 2,855,215 | 10/58 | Sheren | 280—150 |
| 2,880,788 | 4/59 | Phillips | 280—150 |
| 3,003,786 | 10/61 | Liston | 280—150 |
| 3,042,137 | 7/62 | Mathues | 180—90 |
| 3,074,760 | 1/63 | Hodgekin | 297—386 |

FOREIGN PATENTS

| | | |
|---|---|---|
| 582,985 | 10/24 | France. |
| 700,743 | 1/31 | France. |
| 882,167 | 11/61 | Great Britain. |
| 1,068,580 | 2/54 | France. |
| 1,248,108 | 10/60 | France. |

A. HARRY LEVY, *Primary Examiner.*

LEO FRIAGLIA, *Examiner.*